United States Patent [19]

Friedmann

[11] Patent Number: 5,150,992
[45] Date of Patent: Sep. 29, 1992

[54] CUTTING INSERT AND A CUTTING TOOL ASSEMBLY INCORPORATING SUCH AN INSERT

[75] Inventor: Jacob Friedmann, Kfar Havradim, Israel

[73] Assignee: Iscar Ltd., Tefen, Israel

[21] Appl. No.: 589,396

[22] Filed: Sep. 27, 1990

[30] Foreign Application Priority Data

Sep. 28, 1989 [IL] Israel .......................................... 91815

[51] Int. Cl.$^5$ ............................................. B23B 27/04
[52] U.S. Cl. ..................................... 407/110; 407/117
[58] Field of Search ................. 407/102, 109, 110, 117

[56] References Cited

U.S. PATENT DOCUMENTS

| | | | |
|---|---|---|---|
| 4,588,333 | 5/1986 | Gustafson | 407/110 |
| 4,801,224 | 1/1989 | Pettersson et al. | 407/110 |
| 4,909,677 | 3/1990 | Noguchi et al. | 407/117 |

FOREIGN PATENT DOCUMENTS 0059602  9/1982  European Pat. Off. .
3442102  6/1986  Fed. Rep. of Germany ........ 407/77

Primary Examiner—Daniel W. Howell
Attorney, Agent, or Firm—Burgess, Ryan and Wayne

[57] ABSTRACT

A cutting insert for use in a cutting tool assembly comprising first and second longitudinally directed insert surfaces directed at an acute angle with respect to each other and defining between them a centrally disposed, wedge-shaped body portion of the insert; a leading end portion of the insert formed integrally with a wider end portion of the wedge-shaped body portion and formed with a cutting edge and with an abutment shoulder located between the cutting edge and an adjacent end of said first insert surface and a trailing end portion of the insert formed integrally with a narrower end portion of the wedge-shaped body portion and defined between a wholly recessed extension of said first insert surface and said second insert surface.

6 Claims, 5 Drawing Sheets

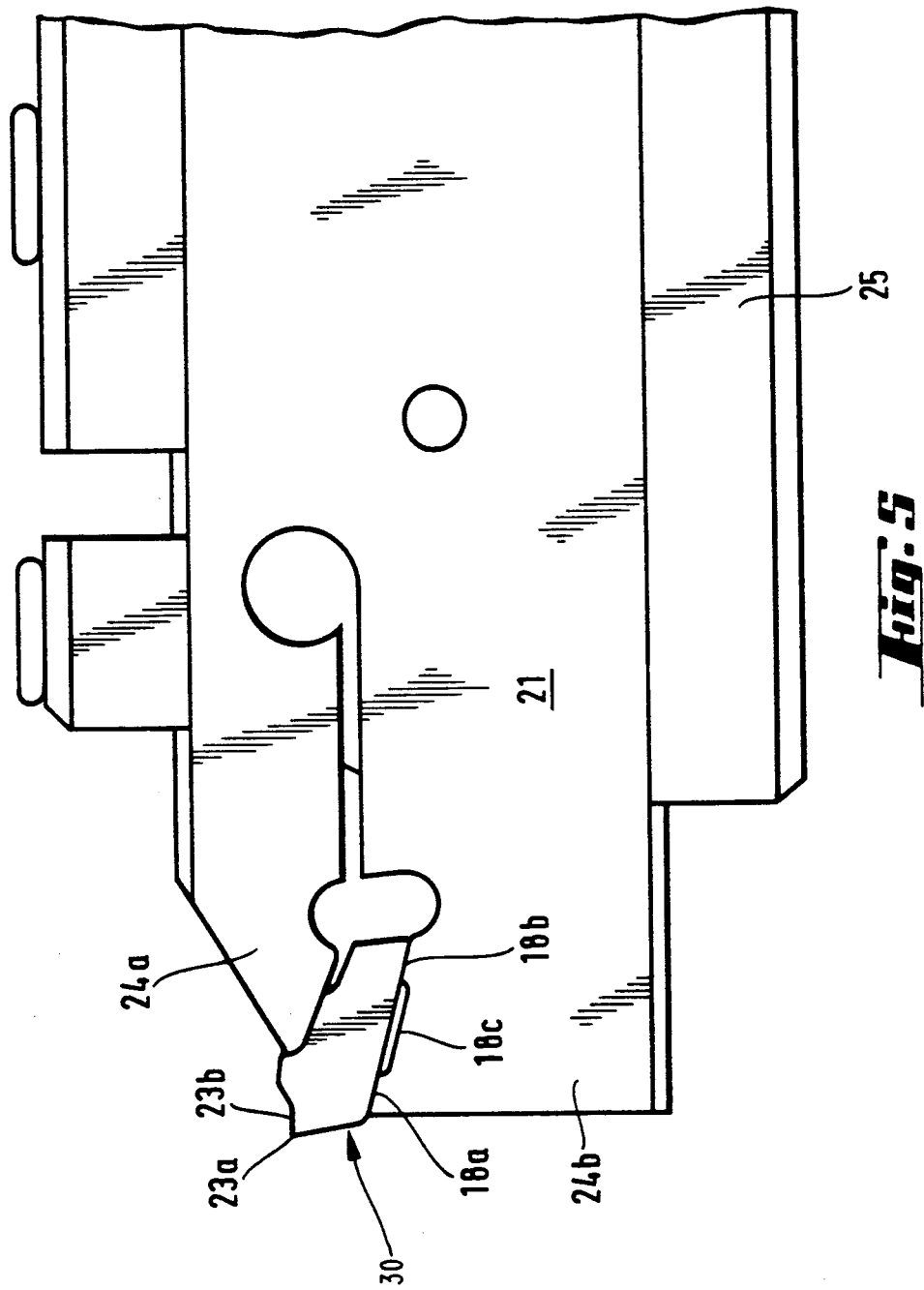

CUTTING INSERT AND A CUTTING TOOL ASSEMBLY INCORPORATING SUCH AN INSERT

FIELD OF THE INVENTION

This invention relates to a cutting insert for use in a cutting tool assembly. Such an assembly can be designed for use in parting and/or grooving operations and the cutting insert is formed of a hard metal (for example, tungsten carbide) and is mechanically and releasably retained within an open-ended slot formed in an appropriate tool holder.

Alternatively or additionally the cutting tool assembly can be designed for use both for parting and/or grooving and also for lateral turning operations and all this with the same insert which is hereinafter referred to as a "multi-directional cutting insert".

BACKGROUND OF THE INVENTION

There is described in our earlier European Patent Specification (Publication No. 0 059 602) a cutting tool assembly for use in parting and/or grooving wherein the cutting insert is formed with a wedge-shaped body portion which is designed to be inserted into, and frictionally retained within, a corresponding wedge-shaped slot formed in the tool holder. Such a cutting tool assembly will hereinafter be referred to as a cutting tool assembly of the kind specified. Our European Patent Specification proceeds to consider the problem which may arise with cutting tool assemblies of the kind specified, wherein the precise positioning of the cutting edge formed on the cutting insert depends, to a large degree, on the degree of insertion of the cutting insert into the slot.

Furthermore, out earlier European Patent Specification considers the problem which may arise where the insert is forced into the slot with extreme force, thereby giving rise to the tendency of the tool holder to fracture. In order to overcome or minimise these problems, our earlier European Patent Specification proposes providing the insert, in a region adjacent to its cutting edge, with an abutment shoulder, which shoulder will abut a corresponding end portion of the tool holder. In this way the degree of insertion of the cutting insert into the tool holder is limited (thus avoiding the dangers of fracture of the tool holder) and alos ensuring that the degree of insertion of the insert into the tool holder remains constant, this resulting in a constant positioning of the cutting edge.

It has been found in practice that with cutting tool assemblies of the kind specified, provided with such limiting abutment shoulders, the regions of the wedge-shaped body portion of cutting insert which are frictionally held by the tapering surfaces of the wedge-shaped slot in the tool holder, are to a large extent dependent on the relative production tolerances of the cutting insert, on the one hand, and the tool holder, on the other hand and by the combination thereof. Situations arise in practice wherein the insert may be held in the tool holder at one or other localised extremity thereof, thereby giving rise to unstable retention of the insert within the tool holder when the insert is subjected to cutting forces. This is especially the case when multi-directional inserts are employed for lateral turning with the consequent subjection of the inserts to side cutting forces.

BRIEF SUMMARY OF THE INVNETION

It is an object of the present invention to provide a new and improved cutting tool assembly in which the above-referred-to disadvantages are substantially reduced or overcome.

According to one aspect of the present invention there is provided a cutting insert for use in a cutting tool assembly comprising first and second longitudinally directed insert surfaces directed at an acute angle with respect to each other and defining between them a centrally disposed, wedge-shaped body portion of the insert;

a leading end portion of the insert formed integrally with a wider end portion of the wedge-shaped body portion and formed with a cutting edge and with an abutment shoulder located between the cutting edge and an adjacent end of said first insert surface and a trailing end portion of the insert formed integrally with a narrower end portion of the wedge-shaped portion and defined between a wholly recessed extension of said first insert surface and said second insert surface.

According to a further aspect of the present invention there is provided a cutting tool assembly comprising a tool holder;

first and second clamping jaws formed integrally as one unit in an end portion of the tool holder;

first and second longitudinally directed jaw surfaces of said first and second jaws respectively forming an acute angel with respect to each other and defining between them an open-ended, wedge-shaped slot opening out towards said end portion of the holder;

a cutting insert comprising first and second longitudinally directed insert surfaces directed at an acute angle with respect to each other and defining between them a centrally disposed, wedge-shaped body portion of the insert;

a leading end portion of the insert formed integrally with a wider end portion of the wedge-shaped body portion and formed with a cutting edge and with an abutment shoulder located between the cutting edge and an adjacent end of said first insert surface;

a trailing end portion of the insert formed integrally with a narrower end portion of the wedge-shaped body portion and defined between a wholly recessed extension of said first insert surface and said second insert surface;

one or both of said second surfaces of said insert and said jaw being formed with a pair of contact regions located respectively at opposite ends of said second insert surface;

said insert being insertable into said slot and being frictionally retainable between said jaws so that the resultant clamping force developed between said first surfaces of said insert and said first jaw is directed substantially intermediate between said contact regions;

said abutment shoulder abutting an exposed end of said first jaw so as to limit the extent of insertion of said insert into said slot.

With such a cutting tool assembly, the provision of the insert with the trailing end portion which, in view of the recessed nature of the extension of the first insert edge, is of smaller height than the wedge-shaped body portion of the insert, contact between the first surface of the insert and the corresponding first surface of the jaw is essentially restricted to the trailing portion of the first surface and the resultant clamping force between these first surfaces is directed intermediate the contact regions between the second surface of the insert and the second surface of the second clamping jaw. In this way, the regions of clamping of the insert by the clamping jaws can be to a very large extent predetermined, irrespective of variations caused by the tolerances inherent in the construction of the insert and clamping jaws. As a result, the insert is always firmly held within the slot defined by the clamping jaws.

The cutting insert in accordance with the invention may be a multi-directional cutting insert in which case it will be formed with both front and side cutting edges and, in order to ensure the lateral stability of the cutting insert within a tool holder the latter can be provided with additional mechanical means for ensuring the effective clamping of the insert between the clamping jaws.

BRIEF SUMMARY OF THE DRAWINGS

For a better understanding of the present invention and to show how the same may be carried out in practice, reference will now be made to the accompanying drawings, in which:

FIGS. 4 and 5 are side elevations of a multidirectional cutting inserts in accordance with the invention shown respectively in appropriate tool holders.

DETAILED DESCRIPTION OF PREFERRED EMBODIMENT

Figure 1:
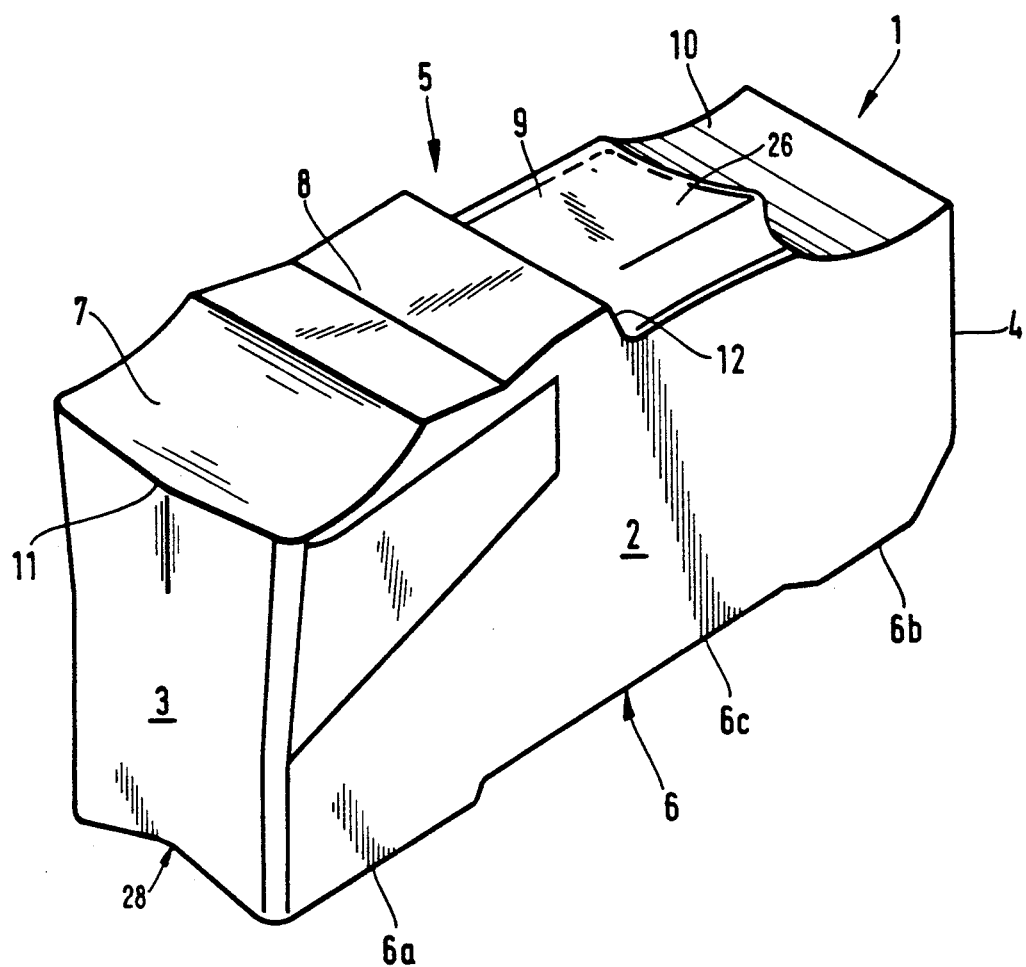
FIG. 1 is a perspective view of a cutting insert in accordance with the invention for use in a cutting tool assembly.

As seen in FIG. 1 of the drawings, a replaceable cutting insert 1 is of generally prismatic shape and comprises side faces 2, front and rear faces 3 and 4, an upper surface 5 and a lower base surface 6.

The upper surface 5 comprises a cutting rake surface 7, a chip deflector surface 8, a sloping clamping surface 9 and a recessed trailing surface 10 forming an extension of the clamping surface 9.

Defined between the cutting rake surface 7 and the front face 3 is a cutting edge 11. The cutting rake surface 7 can be formed with a suitable chip former construction (not shown). The clamping surface 9 merges with the chip deflector surface 8 via an abutment shoulder 12. The clamping surface 9 slopes downwardly with respect to the base surface 6 so as to define with the base surface 6 a centrally-disposed, wedge-shaped body portion of the insert 1. The clamping surface 9 is constituted by a longitudinally extending keying groove 26 of substantially V-shaped cross-section. In a similar manner, the base surface 6 is constituted by a longitudinally extended keying groove 28 of V-shaped cross-section, the grooves 26, 28 of the surface 9 and surface 6 being oppositely directed.

The recessed surface 10 defines with the rear end of the base surface 6 a trailing end portion of the insert, the height of this trailing portion being less than the height of the wedge-shaped body portion at its narrowest end.

The base surface 6 of the insert is formed with a pair of end base regions 6a and 6b and with a relatively recessed central base region 6c.

Figure 2:
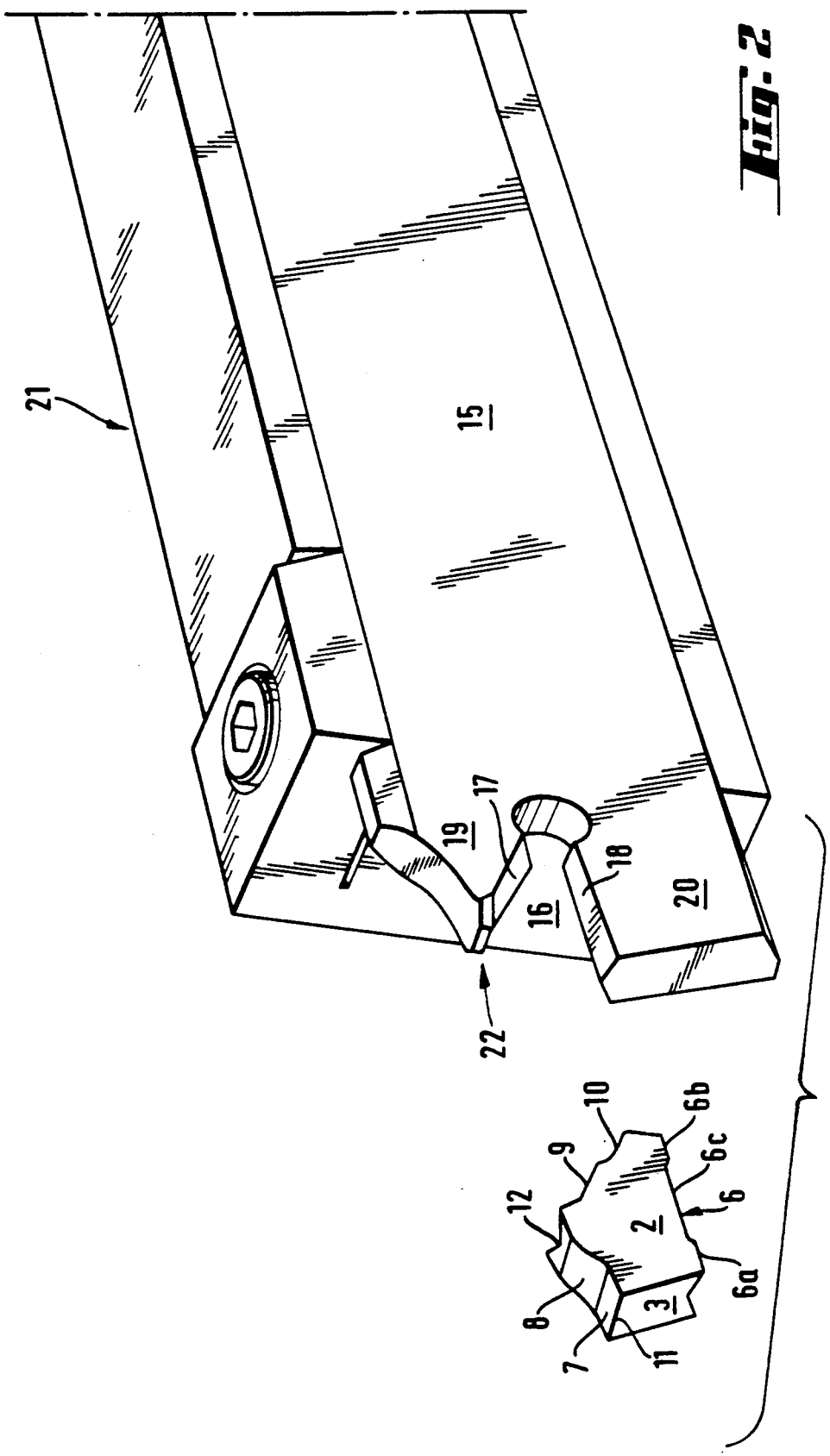
FIG. 2 is a perspective view of the insert shown in FIG. 1, prior to its insertion in a tool holder forming part of the cutting tool assembly.

As seen in FIG. 2 of the drawings, the insert 1 is designed to be retained by a suitable tool holder. This tool holder comprises an elongated holder blade 15 at a leading end of which is formed an open-ended, wedge-shaped slot 16. The slot 16 is bounded by surfaces 17 and 18 respectively of clamping jaws 19 and 20 formed integrally as one piece with the holder blade 15. The surfaces 17 and 18 are formed as V-shaped keying ribs which are designed to mate within the V-shaped grooves formed in the surfaces 9 and 6 of the insert 1.

The holder blade 15 is designed to be retained in a holder block 21 which, in its turn, is designed to be held in a machine tool (not shown).

Figure 3:
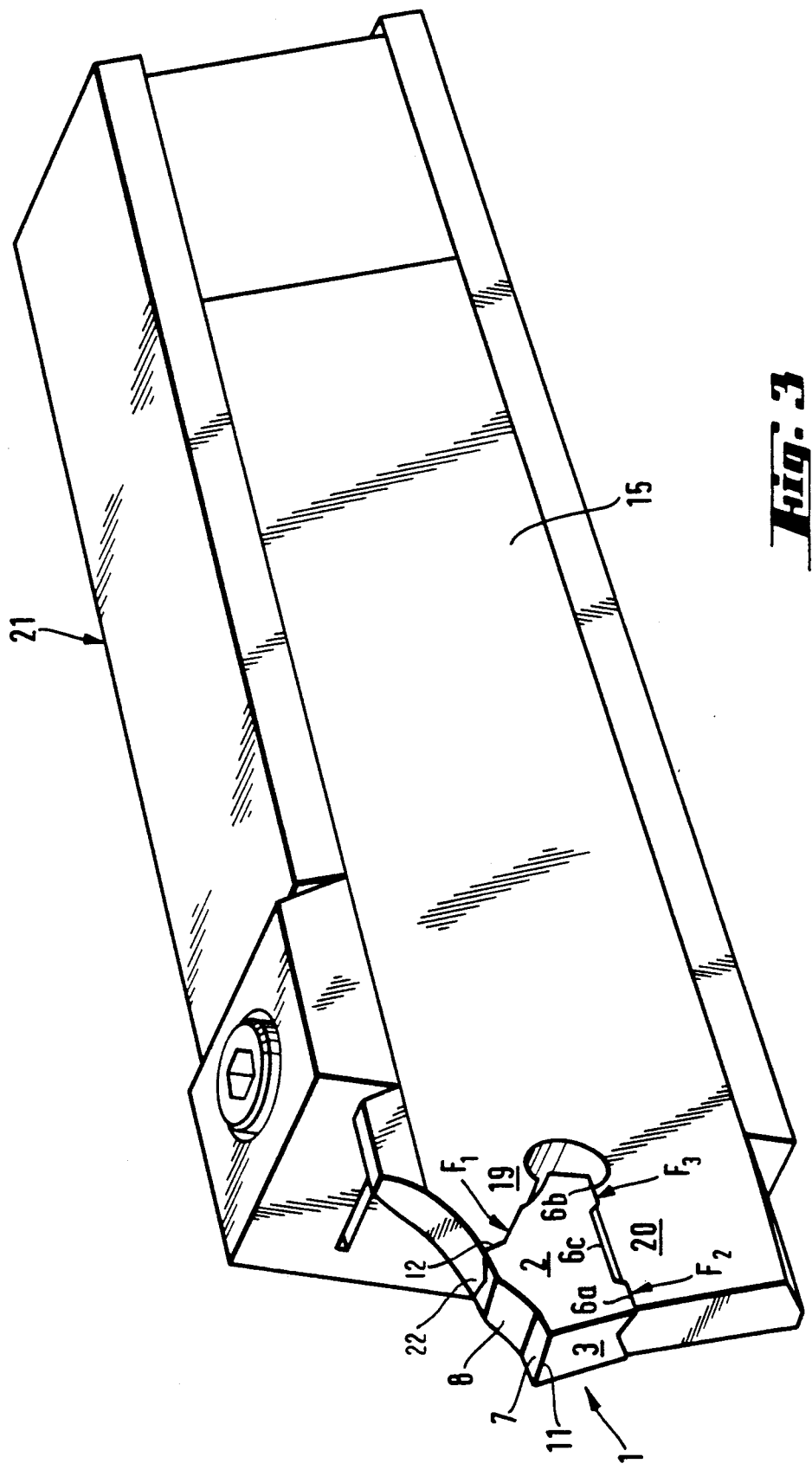
FIG. 3 is a perspective view of the assembled insert and tool holder.

As shown in FIG. 3 of the drawings, the insert 1 is pushed into the slot 16 of the blade 15, with the V-shaped ribs of the surface 17 and 18 mating within the V-shaped grooves 26, 28 of the surfaces 6 and 9 and with the base regions 6a and 6b of the insert 1 firmly seated on the surface 18 of the jaw 20. At the same time, and with the insert fully inserted into the slot 16, an end portion 22 of the jaw 19 bears against the abutment shoulder 12, thereby limiting the degree of insertion of the insert 1 into the slot 16 and in this way ensuring that the cutting edge 11 of the insert 1 is always in a desired predetermined position.

By virtue of the provision of the recessed trailing end portion of the insert 1 contact between the jaw 19 and the insert 1 only takes place on the sloping surface 9, and it is ensured that the clamping force generated between the surface 17 of the jaw 19 and the corresponding sloping surface 9 of the insert 1 is localised in a region close to the trailing end of the sloping surface 9. In consequence, a resulting clamping force $F_1$ developed between the sloping surface 9 of the insert 1 and the surface 17 of the jaw 19 is directed intermediate to the clamping forces $F_2$ and $F_3$ generated between the surface 18 of the jaw 20 and the localised base regions 6a and 6b. In this way, there can be ensured maximum stability of clamping of the insert 1 within the tool holder, irrespective of tolerances of manufacture both of the insert and the tool holder.

Whilst in the embodiment described above the surfaces 6 and 9 of the insert 1 are provided with V-shaped grooves 26, 28 whilst the surfaces 17 and 18 of the jaws are provided with V-shaped ribs, the sloping surfaces of the insert may be provided with V-shaped ribs whilst the corresponding surfaces 17 and 18 of the jaws may be provided with V-shaped grooves.

Whilst the cutting tool arrangement in accordance with the invention has been described above as applied to a stationary tool holder, the invention is equally applicable where the inserts are to be inserted into appropriate slots formed in the periphery of a rotary tool holder.

Figure 4:
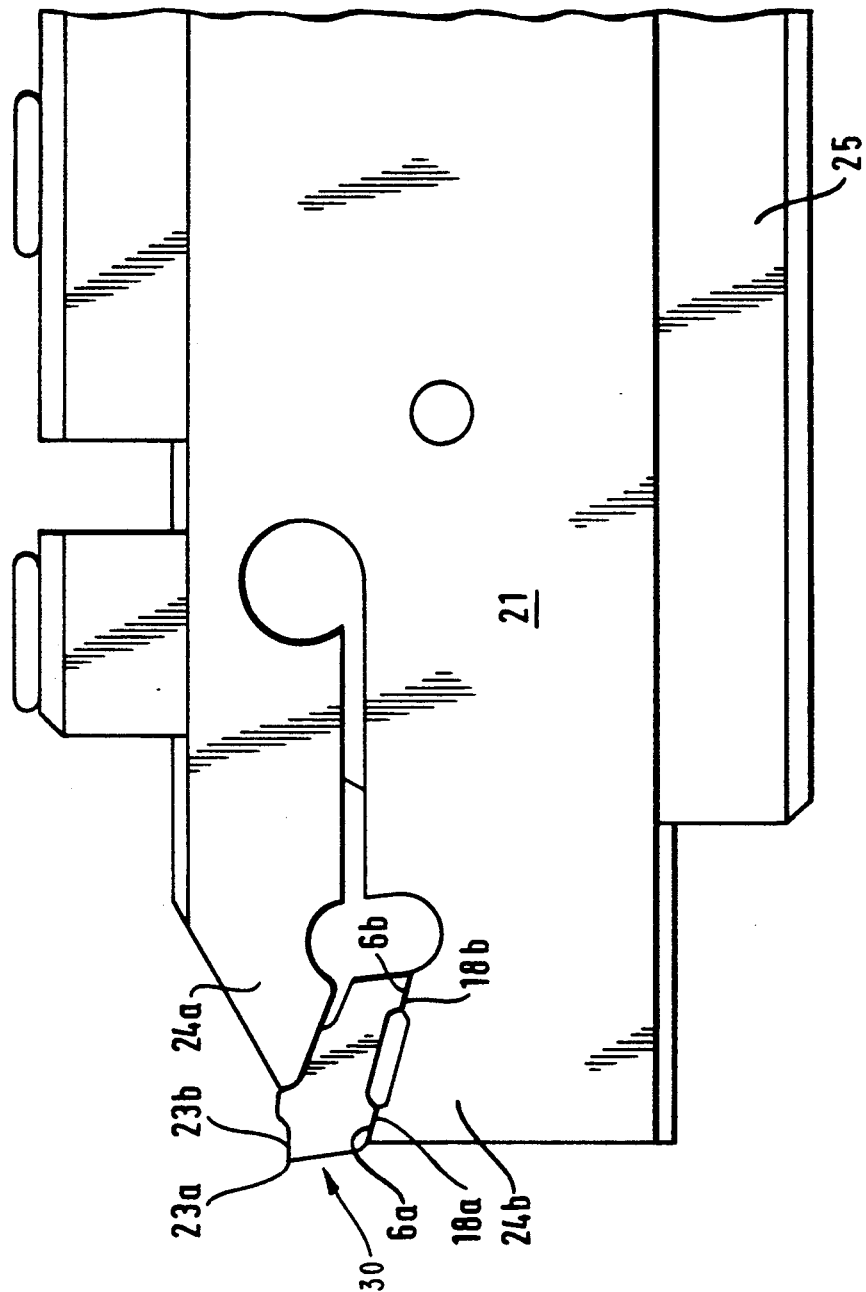

FIG. 4 illustrates a tool holder 21 provided with a cutting insert 30 in accordance with the invention having, in addition to a front cutting edge 23a also side cutting edges 23b, a suitable chip former construction (not shown) being provided. The insert 30 is therefore multi-directional and can be employed for both parting as well as lateral turning operations. The use of such a multi-directional cutting insert 30 in lateral turning gives rise to transversely directed cutting forces and in order to ensure the stability of the insert 21 vis a vis such forces the tool holder 21 is formed with clamping jaws 24a and 24b which are forced into clamping contact with the insert 30 by suitable tightening of a tool block 25 in which the tool holder is held.

In the construction described above, with reference to FIGS. 2 and 3, localised base regions 6a and 6b of contact between the lower surface 6 of the insert 1 and the adjacent surface 18 of the jaw 20 are achieved by providing the insert 30 with projecting regions 6a and 6b. Equivalent results can be obtained (as seen in FIG. 5 of the drawings) by forming the surface 18 with localised raised portions 18a, 18b at the ends thereof with a central recessed portion 18c, whilst the lower surface of the insert 6 is rendered substantially flat. Alternatively, and as shown in FIG. 4 of the drawings, both the insert 1 and the surface 18 can be provided with these localised, regions (6a, 6b; 18a, 18b), which seat against each other, thereby ensuring localised contact between the insert 30 and the surface 18 and the generation of clamping forces at these localised regions. Furthermore, by restricting the area of contact between the contiguous surfaces of the insert 30 and the lower jaw 18, frictional wear of the jaw surface is also limited.

I claim:

1. A cutting insert for use in a cutting tool assembly comprising first and second longitudinally directed insert surfaces directed at an acute angle with respect to each other and defining between them a centrally disposed, wedge-shaped body portion of the insert;

a leading end portion of the insert formed integrally with a wider end portion of the wedge-shaped body portion and formed with a cutting edge and with an abutment shoulder located between the cutting edge and an adjacent end of said first insert surface; and a trailing end portion of the insert formed integrally with a narrower end portion of the wedge-shaped body portion and defined between a wholly recessed extension of said insert surface and said second insert surface, said second insert surface being formed with a central recessed portion.

2. A cutting insert according to claim 1 wherein said leading end portion is formed with a front cutting edge and a pair of side cutting edges.

3. A cutting tool assembly comprising:

a tool holder;

first and second clamping jaws formed integrally as one unit in an end portion of the tool holder;

first and second longitudinally directed jaw surfaces of said first and second jaws respectively forming an acute angle with respect to each other and defining between them an open-ended, wedge-shaped slot opening out towards said end portion of the holder;

a cutting insert comprising first and second longitudinally directed insert surfaces directed at an acute angle with respect to each other and defining between them a centrally disposed, wedge-shaped body portion of the insert;

a leading end portion of the insert formed integrally with a wider end portion of the wedge-shaped body portion and formed with a cutting edge and with an abutment shoulder located between the cutting edge and an adjacent end of the said first insert surface;

a training end portion of the insert formed integrally with a narrower end portion of the wedge-shaped body portion and defined between a wholly recessed extension of said first insert surface and said second insert surface;

one or both of said second surfaces of said insert and said jaw being formed with a pair of contact regions located respectively at opposite ends of said second insert surface;

said insert being insertable into said slot and being frictionally retainable between said jaws so that the resultant clamping force developed between said first surfaces of said insert and said first jaw is directed substantially intermediate between said contact regions;

said abutment shoulder abutting an exposed end of said first jaw so as to limit the extent of insertion of said insert into said slot.

4. A cutting tool assembly according to claim 3 wherein the second surface of said insert is formed with a pair of end base regions and with a recessed central base region.

5. A cutting tool assembly according to claim 3 or 4 wherein the second surface of said second jaws is formed with a pair of end regions and with a relatively recessed central region.

6. A cutting tool assembly according to claim 4, wherein said first and second surface of said insert are formed with longitudinally directed, substantially V-shaped keying grooves, whilst the first and second surfaces of said clamping jaws are formed with longitudinally directed substantially V-shaped keying ribs.

* * * * *